United States Patent [19]

Herman et al.

[11] Patent Number: 4,893,651

[45] Date of Patent: Jan. 16, 1990

[54] SELF-VENTING DRAIN VALUE ASSEMBLY

[75] Inventors: Peter K. Herman, Cookeville, Tenn.; Jean Y. Bouchet, Quimper; Daniel Fertil, Plogonnec, both of France

[73] Assignee: Cummins Engine Company, Inc., Columbus, Ind.

[21] Appl. No.: 293,964

[22] Filed: Jan. 6, 1989

[51] Int. Cl.[4] ............................................. F16K 24/00
[52] U.S. Cl. .................... 137/588; 251/144; 251/351
[58] Field of Search ................ 137/588; 251/144, 346, 251/351; 222/481.5, 484

[56] References Cited

U.S. PATENT DOCUMENTS

| | | | |
|---|---|---|---|
| 754,618 | 3/1904 | Smith et al. | 137/588 |
| 1,288,356 | 12/1918 | Woods | 137/588 X |
| 2,046,474 | 7/1936 | Maggenti | 137/588 |
| 2,333,310 | 11/1943 | Greening | 137/588 X |
| 2,405,681 | 8/1946 | Woock | 137/588 X |
| 2,810,398 | 10/1957 | Carlson | 137/588 |
| 3,044,504 | 7/1962 | Iketani | 141/293 |
| 3,633,625 | 1/1972 | Rudel | 137/588 X |
| 3,727,638 | 4/1973 | Zaremba, Jr. et al. | 137/572 |
| 3,806,085 | 4/1974 | Coda | 251/144 |
| 3,910,572 | 10/1974 | Denler | 251/351 X |
| 4,025,048 | 5/1977 | Tibbitts | 251/144 |
| 4,109,829 | 8/1978 | Kuckens et al. | 137/588 X |
| 4,314,689 | 2/1982 | Wilson | 251/351 X |
| 4,440,193 | 4/1984 | Matheson | 137/588 X |
| 4,457,337 | 7/1984 | Andersson et al. | 137/588 X |
| 4,611,627 | 9/1986 | Eidsvoog et al. | 137/588 |
| 4,708,171 | 11/1987 | Cudaback | 137/588 |
| 4,753,266 | 6/1988 | Matheson et al. | 137/588 X |

Primary Examiner—John Rivell
Attorney, Agent, or Firm—Sixbey, Friedman, Leedom & Ferguson

[57] ABSTRACT

A self-venting valve apparatus using a valve stem rotatably and slidably mounted to a vessel by a collar is disclosed. The stem includes threads at the top and base of the stem which matingly engage internal threads of the collar to hold the stem open or closed. A single gasket seals the gas inlet and liquid outlet in the closed configuration. To drain the fluid, the valve stem is unscrewed so the bottom threads disengage from the collar, the valve stem lowers until the top threads of the valve stem engage the collar, and the top threads are screwed to the collar to secure the valve in the open position. Fluid begins draining through the central passage of the valve stem before gas enters the vessel through the groove in the sidewall of the valve steam to allow proper siphoning. The lower end of the liquid drain passage is placed below the lower end of the air inlet groove, thereby insuring that the liquid drain passage is opened first as the valve stem is lowered. Entering air is isolated from the outgoing water by a riser wall which separates the passage from the groove. The liquid drains through the passage and then exits into a collector knob. The collector knob maintains a regulated and controlled flow resistance through a drain spout.

51 Claims, 6 Drawing Sheets

SELF-VENTING DRAIN VALUE ASSEMBLY

Technical Field

This invention relates to a self-venting valve assembly for draining liquid from a vessel in which the liquid within the vessel may be subjected to a vacuum.

BACKGROUND OF THE INVENTION

Self-venting liquid drain valves have been known in the art for many years. Specifically, various assemblies have been made to provide fluid drainage from a vessel while providing a separate inlet for gas, such as air, to replace the fluid being drained. For example, in fuel/water separators used in diesel engines, water must be periodically drained using a valve assembly adapted to feed air into a separator while the water is being drained. The prior art devices have accomplished this by providing separate air and liquid passages formed through a portion of the valve assembly member.

U.S. Pat. No. 4,440,193 issued to Matheson and assigned to the same assignee (Cummins Engine Company, Inc.) as the present invention discloses a valve assembly for draining a liquid including a valve housing or body member 23 adapted to receive a threaded valve piece 24 rotatably movable between open and closed positions. An air intake passage is contained within body member 23 separate from the liquid drain passage contained in movable valve piece 24. This type of arrangement requires separate sealing means for the air intake passage and the liquid drain passage.

U.S. Pat. No. 4,708,171 issued to Cudaback attempted to simplify the prior art valves by including both the air inlet and liquid passages in a single valve member rotatable between open and closed positions. However, the drain valve disclosed in Cudaback requires a rather complicated valve housing secured to a vacuum vessel and adapted to provide a close fit between the housing and the valve member to ensure proper liquid drainage through radially extending openings at the upper end of the housing. The air inlet passage also requires a sealing point within the housing to prevent gas from entering the vessel when the valve assembly is closed.

Eidsvoog et al. U.S. Pat. No. 4,611,627 discloses a self-venting drain valve with a valve portion 16 movable relative to housing 14 including an air intake 26 and a water passage outlet 34. This device, however, requires at least two different seals (44 and 52), and the intake passage 26 is provided entirely within the non-moving housing 14.

Iketani U.S. Pat. No. 3,044,504 discloses a valve with an axial opening which bends 90 degrees to the side (at 15) and a second passage 12. However, this device is directed to an injector valve that requires at least two seals 13 and 14.

Matheson et al. U.S. Pat. No. 4,753,266, assigned to the same assignee of the present invention, discloses another valve assembly having two passages 26, 27, one for draining liquid and another serving as an air vent. Valve member 22 is rotatably mounted on body member 21, but the rotation is limited to 90°. The valve member rotates so that its passages 32, 33 engage passages 26, 27 when the valve is open. Three 0-ring seals are used to seal the two passages and the valve assembly to the vessel.

The prior art fails to accomplish or teach draining liquid from a vessel using a simple valve assembly requiring minimal manufacturing and replacement costs.

SUMMARY OF THE INVENTION

It is an object of the present invention to provide a self-venting valve apparatus for draining liquid from a vessel which is simple in construction and relatively inexpensive to manufacture.

It is an additional object of the present invention to provide a self-venting valve apparatus including a valve stem formed to cause liquid to drain from the vessel through a central passage contained in the stem and simultaneously to cause gas to enter the vessel through a groove contained in the sidewall of the stem when the valve apparatus is opened.

It is still another object of the present invention to provide a self-venting valve apparatus wherein a gasket is trapped between a collar attached to the vessel and the base of the valve stem to provide a single seal for both the liquid and gas when the valve apparatus is closed.

It is yet another object of the present invention to provide a cutaway portion extending downwardly from the top of the valve stem to effectively lower the point at which liquid from the vessel enters into the central portion of the valve stem and also to form on the opposite side of the stem a riser to isolate the gas entering the vessel from the liquid being drained therefrom.

It is also an object of the present invention to provide a simple, self-venting apparatus for draining liquid from a vessel including an operator knob which can be snapped onto the base of the valve to provide a cup or reservoir to collect liquid being drained from the vessel and to provide constant flow resistance during liquid drainage.

Yet another object of the present invention is to provide a self-venting drain valve assembly of the type described above having an air inlet passage and a liquid drain passage wherein the effective cross-sectional area ratio of drain passage to inlet passage ranges between 4 and 5 and preferably is 4.6.

Still another object of the present invention is to provide a self-venting drain valve assembly of the type described above wherein the liquid drain outlet is vertically separated from the air inlet by a distance of at least approximately one inch to facilitate proper siphoning.

These and other objects of the present invention are achieved in a self-venting valve apparatus which uses a valve stem rotatably and slidably mounted to a vessel by a collar. The stem includes threads at the base of the stem which can matingly engage internal threads of the collar to hold positively the stem in its closed position. External threads may also be provided at the top of the stem to retain the stem in its open position and to allow assembly and disassembly of the stem with the collar. A single gasket is provided to seal the gas inlet and liquid outlet in the closed configuration. To drain the fluid, the valve stem is unscrewed to cause the bottom threads to disengage from the collar and allow the valve stem to drop until the top threads of the valve stem engage the collar to stop downward movement of the stem. Upon further rotation of the stem, the top threads may be engaged with the internal threads of the collar to secure the valve in the open position or to allow the stem to be removed altogether from the collar. By virtue of this design, fluid tends to begin draining through the central passage of the valve stem before gas enters the vessel through the groove in the sidewall of the valve stem to insure proper commencement of siphoning. This is accomplished in the present invention by placing the lower end of the liquid drain passage below the lower end of the air inlet groove, thereby insuring that the liquid drain passage is opened first as the valve stem is lowered. Entering air is isolated from the outgoing water by a riser wall formed by a cutaway portion at the upper end of the stem on the side opposite from the groove. The cutaway portion extends downwardly from the top of the valve stem to form an enlarged liquid outlet from the vessel at a point well below the upper end of the groove through which air enters the vessel. The liquid first drains axially through the central passage of the stem and then enters a 90° radial passage to exit radially through the sidewall of the stem. The collector or operator knob is attached to the bottom of the stem and is cup-shaped to collect liquid exiting through the drain passage of the stem as well as any liquid which may leak from the vessel between the collar and stem. The collector knob may include a drain spout adapted to allow the user to connect a hose to drain the fluid without spillage.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF THE PREFERRED EMBODIMENT

Figure 1:
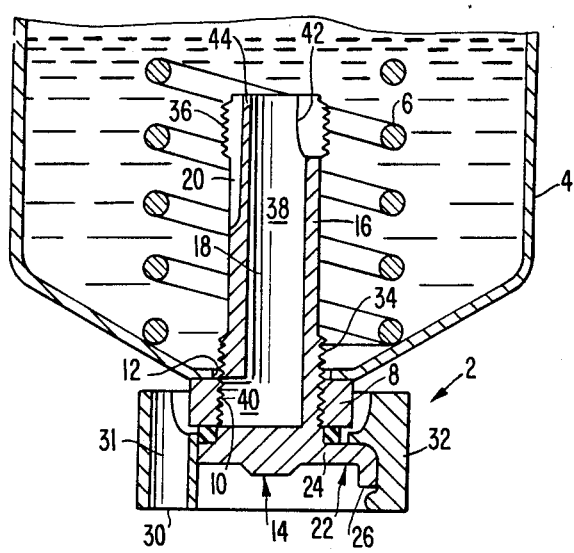
FIG. 1 is a cross-sectional view of the self-venting drain valve assembly of the present invention with the assembly in the closed position.

For a more complete understanding of the subject invention, reference is now made to FIG. 1, showing a cross-sectional view of a specific self-venting valve assembly. The disclosed valve assembly 2 is illustrated in combination with a vessel 4 which may be a portion of the housing of a water/fuel separator. Such separators are frequently installed on the vacuum side of a fuel pump, thereby subjecting the interior of vessel 4 to sub-atmospheric pressure. A compression spring 6 operates to properly position a filter (not illustrated) within the water/fuel separator as is explained more fully in U.S. Pat. No. 4,440,193.

During operation of a water/fuel separator, water accumulates in the bottom portion of vessel 4 and must be drained periodically to permit continued satisfactory operation of the separator. To perform this function, valve assembly 2 provides a drain path through which water collected in the base of vessel 4 may be drained out of the vessel while providing a passage for air to enter vessel 4 simultaneously to break the vacuum within the vessel and facilitate drainage. As will be explained more fully below, the valve assembly 2 described herein provides a self-venting feature by a structure which is comparatively simple and inexpensive to manufacture as compared with prior art designs.

Self-venting valve assembly 2 includes a collar or body portion 8, which may take the form of a weld nut, adapted to be welded to the bottom of vessel 4, such that the threaded opening 10 of body portion 8 aligns with an aperture 12 in the lowest portion of vessel 4. A valve element 14 is positioned for reciprocating movement within threaded opening 10 of body portion 8 between a closed position, as illustrated in FIG. 1, and an open position, shown in FIG. 2. In the open position, gas enters and liquid drains from vessel 4 along separate paths. Valve element 14 is formed by a stem 16 containing an internal passage 18 through which liquid such as water may drain from vessel 4. On its exterior, stem 16 is provided with an axially extending groove 20 through which air can enter vessel 4. Valve element 14 also includes valve base portion 22 formed at the bottom of valve stem 16. Base portion 22 includes a radial flange 24 and peripheral skirt 26. Peripheral skirt 26 includes a series of reinforcing ribs 26a as will be described below with reference to FIG. 9.

Valve assembly 2 further includes a collector knob or operator 32 which is disposed around base portion 22 of valve stem 16 to facilitate manual operation and to assist in draining water as will be discussed below. The lower portion of stem 16 disposed just above base portion 22 of valve element 14 includes external threads 34 which threadedly mate and are received within threaded opening 10 of body portion 8. External threads 34 engage threaded opening 10 as shown in FIG. 1 when valve assembly 2 is in the closed position. When valve assembly 2 is in the open position, as shown in FIG. 2, external threads 36 formed at the upper portion of stem 16 engage threaded opening 10 of body portion 8 to secure open the valve assembly.

Figure 2:
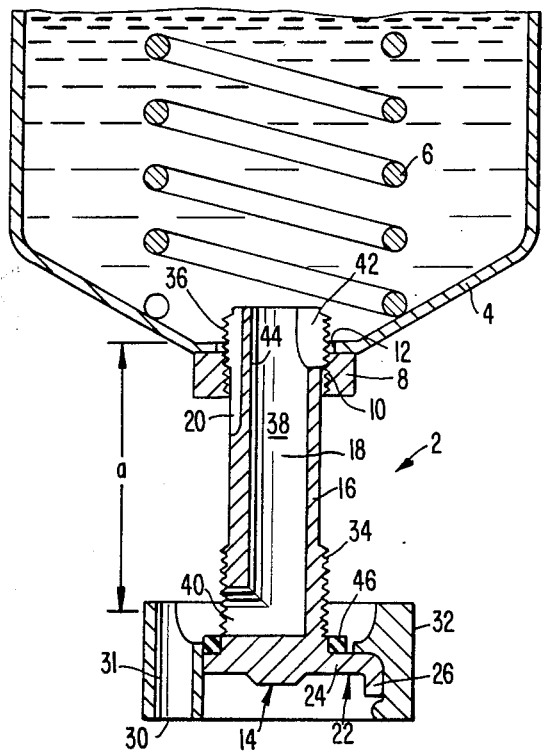
FIG. 2 is a cross-sectional view of the self-venting drain valve assembly of FIG. 1 with the assembly in the open position.
Figure 3:
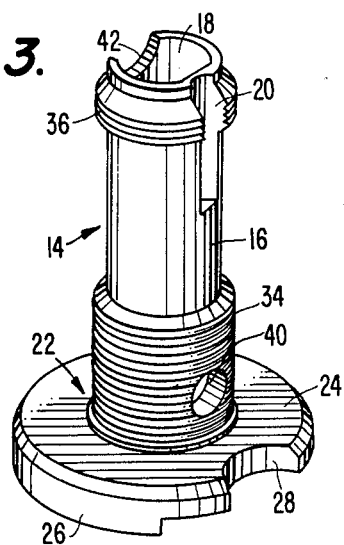
FIG. 3 is a perspective view of the valve stem of the valve assembly.
Figure 7:
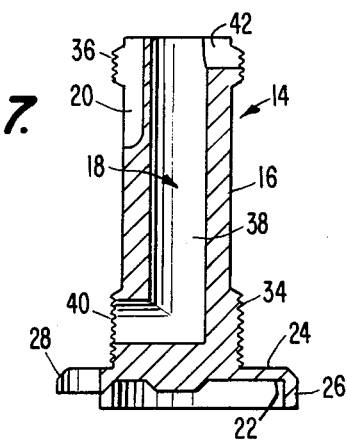
FIG. 7 is a cross-sectional view of the valve stem taken along lines 7—7 of FIGS. 5 and 6.

As best illustrated in FIGS. 1, 2, and 7, internal passage 18 includes two segments, axial passage 38 and radial passage 40. Radial passage 40 and axial passage 38 are disposed at substantially 90° right angles to each other. The upper opening to internal passage 18 is enlarged by cutaway portion 42 at the top of stem 16 substantially at the location of external threads 36. Cutaway portion 42 effectively lowers the water inlet from the top of valve stem 16 to permit air to vent into the system at a higher level than water flowing into the valve. Additionally, it has been found that the optimum ratio of the area of the water outlet to the area of the air inlet is between 4 and 5, preferably 4.6.

As shown in FIG. 2, the distance between the entry of air into the vessel as allowed by groove 20 and the center of radial passage 18 is indicated by a. Preferably a is at least one inch long to facilitate drainage of vessel 4. With the water outlet from passage 18 at least one inch below the air inlet when valve assembly 2 is open, proper siphoning of water has been found to be facilitated. It has been found that the water outlet should open slightly before the air inlet opens to provide the proper flow sequencing. This function is achieved by terminating the lower end of groove 20 well above the opening of radial passage 40 into the sidewall of stem 16. Additionally, a riser wall 44 is positioned between air passage groove 20 and cutaway portion 42 to allow water to flow into internal passage 18 at a point somewhat remote from the air flowing into vessel 4. This prevents the incoming air, in the form of bubbles, from being pulled into the out flowing water because riser wall 44 forces the air bubbles to rise upwardly away from the region of higher water velocity.

Gasket 46 disposed around the bottom of stem 16 is trapped between base portion 22 and body portion 8 when valve assembly 2 is in its closed position as shown in FIG. 1. Gasket 46 effectively seals both the air inlet and the water outlet when the valve assembly is in its closed configuration because the air inlet and the water are inside vessel 4. Gasket 46 is the only gasket required. Thus, valve assembly 2 accomplishes the above discussed purposes and achieves the desired design criteria by using only a single sealing surface which may be formed by a lathe cut surface. The use of additional radial seals are eliminated, thereby greatly simplifying the assembly and production processes and simplifying the configuration of the valve assembly.

To drain fluid from vessel 4, when valve assembly is in the closed position as shown in FIG. 1, valve assembly 2 is unscrewed so that external threads 36 no longer mate with threaded opening 10. The unthreaded central portion of stem 16 drops down through aperture 12 at the bottom of vessel 4 and threaded opening 10 in body portion 8, until external threads 36 engage threaded opening 10 to retain the valve assembly 2 in the open position. At this point, liquid such as water in vessel 2 begins to siphon out of the vessel through cutaway portion 42 and the upper opening of internal passage 18. Water is siphoned through passage 18 because the lower portion of passage 18, radial passage 40, is lower than air inlet groove 20 disposed at the top of stem 16. As discussed above, this distance or head, represented by a, should be at least approximately one inch and is important to the proper siphoning of water from the vessel under vacuum conditions. After water exits internal passage 18 through axial passage 38 and radial passage 40, it is caught by valve operator 32 which may be a snap-on plastic knob in the form of a cup with a drain spout 30 containing an axial cylindrical passageway 31 through which the water drains. Drain spout 30 allows connection of a hose to drain fluid into a container without spillage. Additionally, valve operator 32 is cup-shaped to accumulate liquid being drained and also collects any liquid which may leak through the space between the exterior of stem 16 and the threaded opening 10.

Stem 16 and valve operator 32 may be formed of die-cast zinc to permit the valve assembly to be used in marine applications. Valve operator 32 may also be formed of minlon, while body portion 8 is preferably a steel weld nut and gasket 46 is a nitrile gasket. In the embodiment of FIGS. 1–13, valve operator 32 is attached to valve assembly 2 before stem 16 is screwed to body portion 8 rather than being snapped-on to stem 16 after stem 16 is screwed to body portion 8. In an alternate embodiment discussed below, valve operator 32 is attached to valve assembly 2 after stem 16 is screwed to body portion 8.

Reference is now specifically made to FIGS. 3 and 5–7 illustrating more completely the features of valve element 14. In particular, the perspective view of FIG. 3 clearly illustrates that flange 24 of base portion 22 contains a substantially semi-cylindrical cutout portion 28 positioned to accommodate drain spout 30 of valve operator 32 (FIGS. 1 and 2). Peripheral skirt 26 is foreshortened circumferentially on either side of cutout 28 to facilitate attachment of a drain hose (not shown) to drain spout 30.

Figure 4:
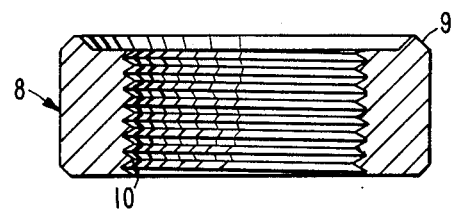
FIG. 4 is a cross-sectional view of the collar element of the valve assembly.
Figure 5:
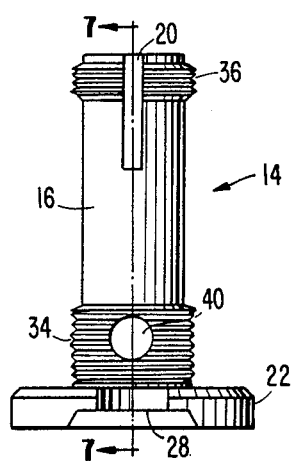
FIGS. 5 and 6 are additional side elevational views of the valve stem.
Figure 6:
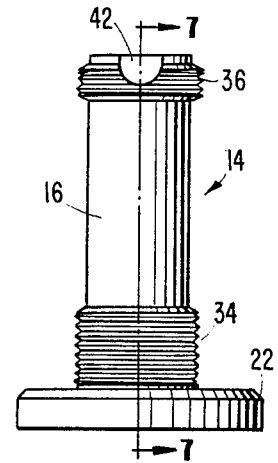

FIG. 4 shows collar 8 and specifically discloses an upper circumferential rib 9 which facilitates leakproof welding of collar 8 to the bottom of vessel 4.

Figure 8:
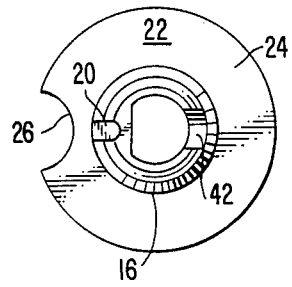
FIGS. 8 and 9 are top and bottom elevational views of the valve stem.
Figure 9:
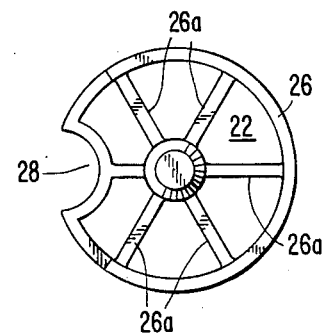
Figure 10:
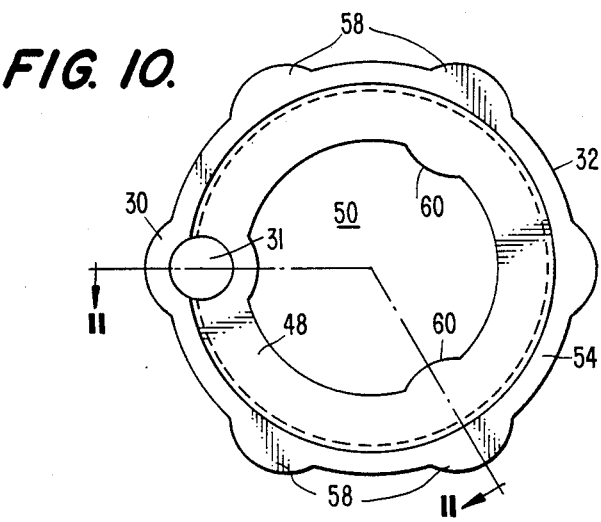
FIG. 10 is a top elevational view of the valve operator.
Figure 11:
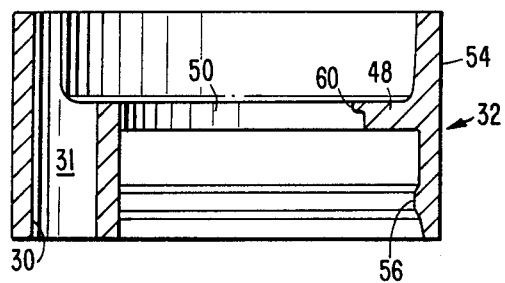
FIG. 11 is a cross-sectional view of the valve operator taken along line 11—11 of FIG. 10.
Figure 12:
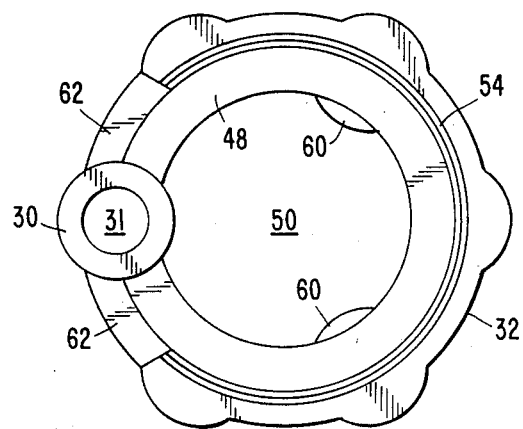
FIG. 12 is a bottom elevational view of the valve operator.

FIGS. 8 and 9 disclose top and bottom views of valve element 14. In particular, FIG. 9 discloses the position of reinforcing radial ribs 26a.

Figure 13:
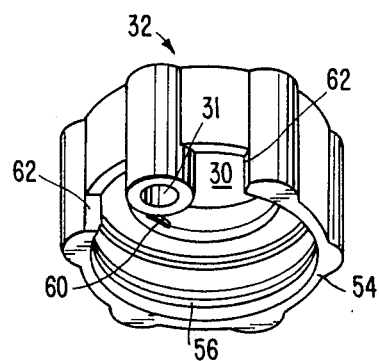
FIG. 13 is a perspective view of the valve operator.

FIGS. 10–13 provide additional views of operator 32 including an internal radial flange 48 having an internal opening 50 for receiving valve element 14. Operator 32 also includes a generally cylindrical outer wall 54 extending axially above internal flange 48 to form a cup-shaped reservoir for collecting liquid and directing its flow toward passageway 31 contained in drain spout 30. The portion of cylindrical outer wall 54 which extends below internal radial flange 48 includes a radially inwardly directed retaining lip 56 arranged to ride over peripheral skirt 26 and snap underneath the lower edge of skirt 26 when operator 32 is assembled with valve element 14. The outer peripheral surface of operator 32 is provided with axially oriented ribs 58 to facilitate manual gripping of the operator. Inwardly directed radial projections 60 are positioned to assist in the retention and proper placement of gasket 46. As best illustrated in FIG. 13, outer wall 54 is notched out at 62 on either side of drain spout 30 to allow a hose to be fitted around the lower end of drain spout 30.

In the embodiment of FIGS. 14–18 (elements described above retain their reference numerals and are the same except as indicated), valve operator 32' is placed around base portion 22 of stem 16 after stem 16 is screwed to body portion 8. This simplifies the manufacturing process and permits gasket retention in the closed posit ion to be accomplished by circumferential rib 9 on body portion 8 which is slightly larger than the outer diameter of gasket 46. This prevents overtightening which may lead to gasket failure, and centers gasket 46 on body portion 8.

Figure 14:
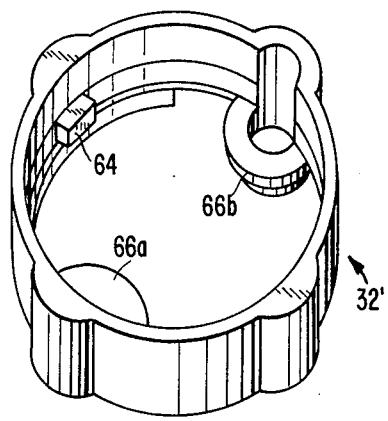
FIG. 14 is a top perspective view of another embodiment of the valve operator.
Figure 15:
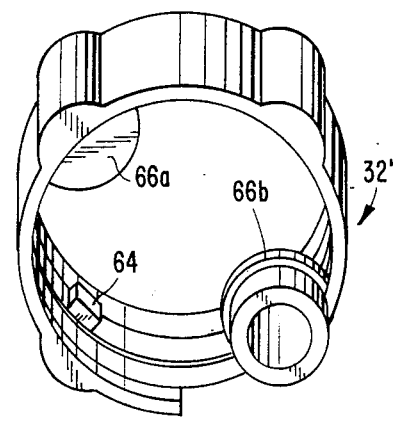
FIG. 15 is a bottom perspective view of the valve operator of FIG. 14.
Figure 16:
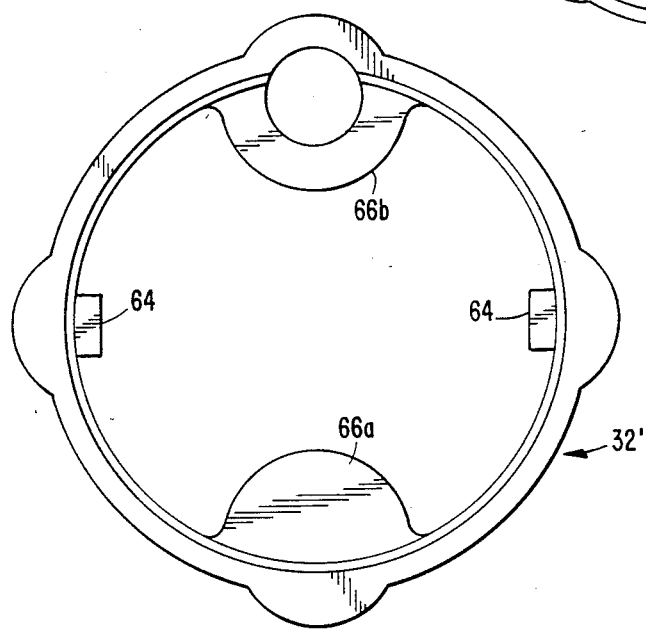
FIG. 16 is a top view of the valve operator of FIG. 14.
Figure 17:
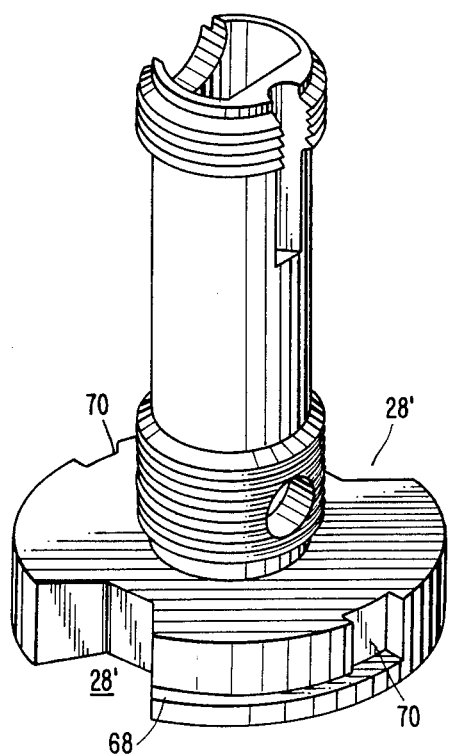
FIG. 17 is a perspective view of another embodiment of valve stem.
Figure 18:
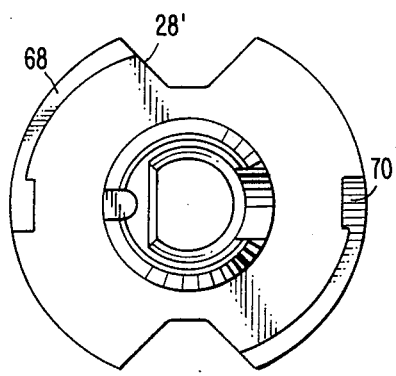
FIG. 18 is a top view of the valve stem of FIG. 17.
Figure 19:
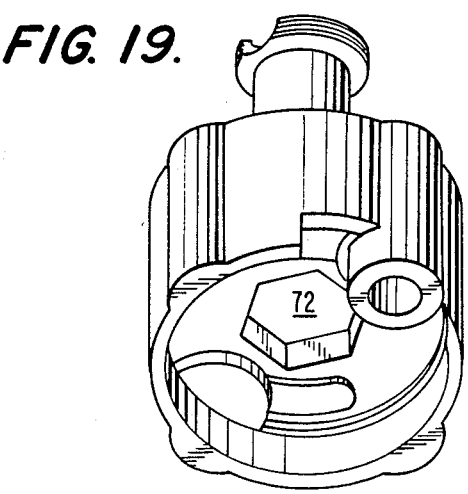
FIG. 19 is a bottom perspective view of the valve operator connected to the valve stem of FIGS. 14–18.

As best shown in FIGS. 14–16, valve operator 32' includes two diametrically opposed inwardly projecting tabs 64 formed approximately midway along the height of outer wall 54 on the inside of wall 54. Two diametrically opposed inwardly projecting semicircular projections 66 are formed on the bottom of walls 54 midway between tabs 64. Projection 66a is solid and projection 66b is open to form part of drain spout 30. Cutout portion 28 is replaced by two diametrically opposed cutout portions 28' in base portion 22 of stem 16 as shown in FIG. 17. Cutout portions 28' are disposed approximately 90° from the outlet of radial passage 40. In operation, only one cutout portion 28' communicates with drain spout 30. The other cutout portion 28' is closed by solid projection 66a. The use of two cutout portions 28' and projection 66a enables valve operator 32' to be disposed on stem 16 in either of two 180° opposed orientations so that operator 32 can easily be properly positioned on valve stem 16. Valve stem 16 also includes two diametrically opposed grooves 68 of decreasing size which end in diametrically opposed enlarged notches 70. To connect valve operator 32' to stem 16, the valve operator is placed around base portion 22 so that tabs 64 are disposed with cutout portions 28'. Valve operator 32' is then rotated so tabs 64 engage portions of grooves 68 having constantly decreasing areas which compress and secure tabs 64 until tabs 64 engage notches 70. At this point, tabs 64 expand to their original shape and are captured within notches 70 thereby securing valve operator 32' on valve stem 16. As shown in FIG. 19, the bottom of valve stem 16 has a hexagonal cutout 72 to facilitate disengagement of the threaded portions of valve stem 16 from body portion 8 using a metric wrench.

Therefore, as discussed above, the valve assembly of the present invention provides a simple self-venting liquid valve using only one gasket face seal to achieve the two required flows. Liquid such as water is permitted to drain while gas such as air enters the vessel being drained to facilitate drainage, even when the vessel is subjected to a vacuum. The air does not mix with the draining water in the valve assembly and it does not interfere with the draining water in the vessel. The valve assembly is relatively simple and inexpensive to manufacture because of the simplicity of design that is a significant improvement over prior art valves.

The valve assembly meets all of the constraints required for self-venting fluid drainage that previously required two seals, a face seal and a radial seal: the water inlet area to air inlet area ratio is approximately 4.6; a one inch head is provided for proper siphoning; the water outlet opens before the air inlet; air is vented into the system at a level higher than the water flowing into the valve assembly; and the water and air flows are isolated from each other.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modification may be effected therein by one skilled in the art without departing from the scope or spirit of the invention.

INDUSTRIAL APPLICABILITY

The present invention finds application with vessels which require fluid drainage. This invention finds particular applicability in the drainage of fluid sumps, such as fuel water separators disposed on the vacuum side of a fuel pump in diesel engine systems. The system uses only one lathe-cut gasket face seal, thereby highly simplifying the construction and assembly of the valve while maintaining the performance of the valve.

We claim:

1. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid and gas movement through said opening is prevented and an open position in which gas entry and a liquid drainage occur along separate fluid paths formed in said valve means, said valve means comprising a stem containing at least one groove formed in the exterior surface of said stem, said stem and said body cooperating to form one of said fluid paths through said groove wherein an upper portion of said groove remains in said vessel while said valve means is in said open position.

2. A self-venting valve assembly as set forth in claim 1 wherein said stem comprises top, bottom, and central portions and said bottom portion comprises external threads which threadedly secure said stem in said closed position.

3. A self-venting valve assembly as set forth in claim 2 wherein said top portion of said stem comprises external threads which engage said body portion and provide a point of abutment between said stem and said body portion when said stem is in its open position, and which threadedly secure said stem in said open position.

4. A self-venting valve assembly as set forth in claim 3 wherein said body portion comprises a collar attached to the vessel, said collar comprising internal threads adapted to matingly engage said external threads of said top and bottom portions of said stem to hold said stem in its open and closed positions, respectively.

5. A self-venting valve assembly as set forth in claim 4 further comprising a single gasket positioned between said stem and said collar to seal said gas entry and liquid drain paths.

6. A self-venting valve assembly as set forth in claim 4 wherein said stem has an internal passage providing the second of said fluid paths and said groove provides said gas entry path and said internal passage provides said liquid drain path, said internal passage includes an axial portion which opens at said top portion of said stem to provide a liquid inlet to said stem and a radial portion which opens through a sidewall at said bottom portion of said stem to provide a liquid outlet from said stem; and said top portion of said stem further comprises a riser wall disposed between and separating said groove from said internal passage to thereby isolate the liquid draining from the gas entering said valve means, and a cutaway portion extending downwardly from said top portion of said stem and connected to said axial portion of said internal passage at said top portion of said stem, said cutaway portion providing an effectively lower liquid entry level in to said valve means at said top portion of said stem.

7. A self-venting valve assembly as set forth in claim 6 wherein said liquid drain level is at least one inch below said gas entry.

8. A self-venting valve assembly as set forth in claim 6 wherein the ratio of the liquid outlet area to the gas inlet area is approximately 4.6.

9. A self-venting valve assembly as set forth in claim 4 further comprising a cup-shaped valve operator disposed on said bottom portion of said stem to assist the drainage of liquid from the vessel by accumulating draining liquid to maintain a constant liquid head and controlled flow resistance.

10. A self-venting valve assembly as set forth in claim 1 further comprising a single gasket positioned between said stem and said collar to seal said gas entry and liquid drain paths.

11. A self-venting valve assembly as set forth in claim 1 wherein said stem has an internal passage providing the second of said fluid paths.

12. A self-venting valve assembly as set forth in claim 6 wherein said top portion of said stem further comprises a riser wall disposed between and separating said groove from said internal passage to thereby isolate the liquid draining from the gas entering said valve means.

13. A self-venting valve assembly as set forth in claim 11 wherein said internal passage includes an axial portion which opens at said top portion of said stem to provide a liquid inlet into said stem and a radial portion which opens through a sidewall at said bottom portion of said stem to provide a liquid outlet from said stem.

14. A self-venting valve assembly as set forth in claim 6 wherein said groove provides said gas entry path and said internal passage provides said liquid drain path and wherein said stem further includes a cutaway portion extending downwardly from said top portion of said stem and connected to said axial portion of said internal passage at said top portion of said stem, said cutaway portion providing an .pa effectively lower liquid entry level into said valve means at said top portion of said stem.

15. A self-venting valve assembly as set forth in claim 14 wherein said liquid drain level is at least one inch below said gas entry level.

16. A self-venting valve assembly as set forth in the claim 11 wherein the ratio of the liquid outlet area to the gas inlet area ranges between 4 and 5.

17. A self-venting valve assembly as set forth in claim 16 wherein the ratio of the liquid outlet area to the gas inlet area is approximately 4.6.

18. A self-venting valve assembly as set forth in claim 1 wherein said valve stem includes a cup-shaped base portion with a radial flange.

19. A self-venting valve assembly as set forth in claim 18 wherein said radial flange includes a peripheral skirt containing reinforcing ribs.

20. A self-venting valve assembly as set forth in claim 18 further comprising a valve operator disposed around said cup-shaped base portion of said stem to assist the drainage of liquid from the vessel.

21. A self-venting valve assembly as set forth in claim 20 wherein said valve operator is cup-shaped to accumulate draining liquid to thereby maintain a constant liquid head and controlled flow resistance.

22. A self-venting valve assembly as set forth in claim 21 wherein said valve operator comprises connecting means for snap-actingly connecting said valve operator to said base portion of said stem.

23. A self-venting valve assembly as set forth in claim 20 wherein said valve operator comprises an axial liquid drainage passage.

24. A self-venting valve assembly as set forth in claim 23 wherein said valve operator further comprises a hose connection.

25. A self-venting valve assembly for draining liquid from a vessel, comprising:

a body portion containing an opening through which liquid may drain and gas may simultaneously enter the vessel;

a valve means for selectively permitting and preventing flow through said opening, said valve means being positioned for reciprocating movement within said opening between a closed position in which the liquid and gas movement through said opening is prevented and an open position in which gas entry and liquid drainage occurs along separate fluid paths formed in said valve means, said valve means comprising a stem, and said stem including a cup-shaped base portion with a radial flange and a peripheral skirt; and a valve operator disposed around said cup-shaped base portion of said stem to assist the drainage of liquid from the vessel, said valve operator having a liquid passageway.

26. A self-venting valve assembly as set forth in claim 25 wherein said stem comprises top, bottom, and central portions and said bottom portion comprises external threads which threadedly secure said stem in said closed position.

27. A self-venting valve assembly as set forth in claim 26 wherein said top portion of said stem comprises external threads which engage said body portion and provide a point of abutment between said stem and said body portion when said stem is in its open position, and which threadedly secure said stem in said open position.

28. A self-venting valve assembly as set forth in claim 27 wherein said body portion comprises a collar attached to the vessel, said collar comprising internal threads adapted to matingly engage said external threads of said top and bottom portions of said stem to hold said stem in its open and closed positions, respectively.

29. A self-venting valve assembly as set forth in claim 28 further comprising a single gasket positioned between said stem and said collar to seal said gas entry and liquid drain paths, wherein said valve operator further comprises inwardly directed radial projections which retain and properly position said gasket.

30. A self-venting valve assembly as set forth in claim 25 wherein said valve operator is cup-shaped to accumulate draining liquid and direct flow toward said valve operator passageway to thereby maintain a constant liquid head and controlled flow resistance.

31. A self-venting valve assembly as set forth in claim 30 wherein said valve operator comprises connecting means for snap-actingly connecting said valve operator to said base portion of said stem.

32. A self-venting valve assembly as set forth in claim 31 wherein said connecting means comprises an internal radial flange having an internal opening for receiving said valve stem.

33. A self-venting valve assembly as set forth in claim 31 wherein said connecting means connects said valve operator to said base portion of said stem before said stem is connected to said body portion.

34. A self-venting valve assembly as set forth in claim 31 wherein said connecting means comprises a radially inwardly directed retaining lip formed on said valve operator and arranged to ride over and snap underneath said valve stem peripheral skirt.

35. A self-venting valve assembly as set forth in claim 25 wherein said valve operator comprises an outer peripheral surface having axially oriented gripping ribs.

36. A self-venting valve assembly as set forth in claim 25 further comprising connecting means for permitting connection of said valve operator to said base portion of said stem after said stem is connected to said body portion.

37. A self-venting valve assembly as set forth in claim 36 wherein said connecting means comprises a tab formed on an inner wall of said valve operator and a notch formed in said base portion of said stem, said tab being captured in said notch to lock said valve operator onto said base portion of said stem.

38. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove, said stem comprises top, bottom, and central portions, and said body portion comprises a collar attached to the vessel, said collar comprising internal threads adapted to matingly engage external threads of said top and bottom portions of said stem to hold said stem in its open and closed positions, respectively, wherein said external threads of said top portion further provide a point of abuttment between said stem and said body portion in said open position.

39. A self-venting valve assembly as set forth in claim 38 further comprising a cup-shaped valve operator disposed on said bottom portion of said stem to assist the drainage of liquid from the vessel by accumulating draining liquid to maintain a constant liquid head and controlled flow resistance.

40. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove, said groove providing said gas entry path, said stem further has an internal passage providing the second of said fluid paths, said internal passage providing said liquid drain path; and said stem further includes a cutaway portion extending downwardly from said top portion of said stem and connected to said axial portion of said internal passage at said top portion of said stem, said cutaway portion providing an effectively lower liquid entry level into said valve means at said top portion of said stem.

41. A self-venting valve assembly as set forth in claim 40 wherein said liquid drain level is at least one inch below said gas entry level.

42. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove, said stem further has an internal passage providing the second of said fluid paths wherein the ratio of the liquid outlet area to the gas inlet area ranges between 4 and 5.

43. A self-venting valve assembly as set forth in claim 42 wherein the ratio of the liquid outlet area to the gas inlet area is approximately 4.6.

44. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid as gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove wherein said valve stem includes a cup-shaped base portion with a radial flange and a valve operator disposed around said cup-shaped base portion of said stem to assist the drainage of liquid from the vessel wherein said valve operator is cup-shaped to accumulate draining liquid to thereby maintain a constant liquid head and controlled flow resistance.

45. A self-venting valve assembly as set forth in claim 44 wherein said valve operator comprises connecting means for snap-actingly connecting said valve operator to said base portion of said stem.

46. A self-venting valve assembly for draining liquid from a vessel, comprising:
   a body portion containing an opening through which liquid may drain and gas may simultaneously enter the vessel; and
   a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove wherein said valve stem includes a cup-shaped base portion with a radial flange and a valve operator disposed around said cup-shaped base portion of said stem to assist the cup-shaped base portion of said stem to assist the drainage of liquid from the vessel wherein said valve operator comprises an axial liquid drainage passage.

47. A self-venting valve assembly as set forth in claim 46 wherein said valve operator further comprises a hose connection.

48. A self-venting valve assembly for draining liquid from a vessel, comprising:
    a body portion containing an opening through which liquid may drain and gas may simultaneously enter the vessel; and
    a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in said valve means, said valve means comprising a stem containing at least one groove formed in the exterior surface of said stem, said stem and said body cooperating to form one of said fluid paths through said groove, said stem comprises top, bottom, and central portions and said body portion comprises a collar attached to the vessel, said collar comprising internal threads adapted to matingly engage external threads of said top and bottom portions of said stem to hold said stem in its open and closed positions, respectively, said external threads of said top portion further providing a point of abuttment between said stem and said body portion in said open position, wherein a single gasket is positioned between said stem and said collar to seal said gas entry and liquid drain paths.

49. A self-venting valve assembly for draining
    a body portion containing an opening through which liquid may drain and gas may simultaneously enter the vessel; and
    a valve means for selectively permitting and preventing flow through said opening, said valve means being positioned for reciprocating movement within said opening between a closed position in which the liquid and gas movement through said opening is prevented and an open position in which gas entry and liquid drainage occur along separate fluid paths formed in which valve means, said valve means comprising a stem containing at least one groove formed in the exterior surface of said stem, said stem and said body cooperating to form one of said fluid paths through said groove, said stem comprises top, bottom, and central portions and said body portion comprises a collar attached to the vessel, said collar comprising internal threads adapted to matingly engage external threads of said top and bottom portions of said stem to hold said stem in its open and closed positions, respectively, said external threads of said top portion further providing a point of abuttment between said stem and said body portion in said open position, wherein said stem has an internal passage providing the second of said fluid paths and said groove provides said gas entry path and said internal passage provides said liquid drain path, said internal passage further including an axial portion which opens at said top portion of said stem to provide a liquid inlet to said stem and a radial portion which opens through a sidewall at said bottom portion of said stem to provide a liquid outlet from said stem; and said top portion of said stem further comprising a riser wall disposed between and separating said groove from said internal passage to thereby isolate the liquid draining from the gas entering said valve means, and a cutaway portion extending downwardly from said top portion of said stem and connected to said axial portion of said internal passage at said top portion of said stem, said cutaway portion providing an effectively lower liquid entry level in to said valve means at said top portion of said stem.

50. A self-venting valve assembly as set forth in claim 49 wherein said liquid drain level is at least one inch below said gas entry.

51. A self-venting valve assembly as set forth in claim 49 wherein the ratio of the liquid outlet are to the gas inlet area is approximately 4.6.

* * * * *

UNITED STATES PATENT AND TRADEMARK OFFICE
CERTIFICATE OF CORRECTION

PATENT NO. : 4,893,651

DATED : January 16, 1990

INVENTOR(S) : Peter K. Herman, Jean Y. Bouchet, Daniel Fertil

It is certified that error appears in the above-identified patent and that said Letters Patent is hereby corrected as shown below:

Title should read as follows:

Self-Venting Drain Valve Assembly

Column 1, line 2, "VALUE" should be changed to "VALVE".

Signed and Sealed this

Twenty-sixth Day of November, 1991

Attest:

HARRY F. MANBECK, JR.

*Attesting Officer*     *Commissioner of Patents and Trademarks*

UNITED STATES PATENT AND TRADEMARK OFFICE
Certificate

Patent No. 4,893,651                                                                           Patented: January 16, 1990

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter K. Herman, Cookeville, TN; Jean Y. Bouchet, Quimper, FRX; Daniel Fertil, Plogonnec, FRX; and Jean Yves Picard, Quimper, FRX.

Signed and Sealed this Eleventh Day of February 2003.

MICHAEL BUIZ
*Supervisory Patent Examiner*
Art Unit 3753